United States Patent [19]

Mathers et al.

[11] 4,086,396
[45] Apr. 25, 1978

[54] ELECTROCHEMICAL CELL WITH POWDERED ELECTRICALLY INSULATIVE MATERIAL AS A SEPARATOR

[75] Inventors: James P. Mathers, Downers Grove; Theodore W. Olszanski, Justice; Carl W. Boquist, Chicago, all of Ill.

[73] Assignee: The United States of America as represented by the United States Department of Energy, Washington, D.C.

[21] Appl. No.: 771,131

[22] Filed: Feb. 23, 1977

[51] Int. Cl.² .............................................. H01M 4/36
[52] U.S. Cl. .................................... 429/103; 429/112; 429/199
[58] Field of Search ............... 429/112, 103, 191, 199, 429/246, 104, 30, 33

[56] References Cited

U.S. PATENT DOCUMENTS

| 1,688,073 | 10/1928 | Gillingham | 429/133 |
| 2,948,769 | 8/1960 | Ruben | 429/133 |
| 3,361,596 | 1/1968 | Senderoff et al. | 429/112 |
| 3,573,986 | 4/1971 | Greenberg | 429/112 X |
| 3,992,222 | 11/1976 | Walsh et al. | 429/112 |

Primary Examiner—Charles F. LeFevour
Attorney, Agent, or Firm—Dean E. Carlson; Frank H. Jackson; Hugh W. Glenn

[57] ABSTRACT

A secondary electrochemical cell includes electrodes separated by a layer of electrically insulative powder. The powder includes refractory materials selected from the oxides and nitrides of metals and metaloids. The powdered refractory material, blended with electrolyte particles, can be compacted in layers with electrode materials to form an integral electrode structure or separately assembled into the cell. The assembled cell is heated to operating temperature leaving porous layers of electrically insulative, refractory particles, containing molten electrolyte between the electrodes.

9 Claims, 3 Drawing Figures

ELECTROCHEMICAL CELL WITH POWDERED ELECTRICALLY INSULATIVE MATERIAL AS A SEPARATOR

CONTRACTUAL ORIGIN OF THE INVENTION

The invention described herein was made in the course of, or under, a contract with the U.S. ENERGY RESEARCH AND DEVELOPMENT ADMINISTRATION.

BACKGROUND OF THE INVENTION

This invention relates to interelectrode separators for secondary electrochemical cells. Batteries of such electrochemical cells are contemplated for use as power sources for electric automobiles, storage of electric energy generated during intervals of off-peak power consumption and various other applications. The separator of this development is particularly applicable to electrochemical cells that operate at high temperatures and therefore require the use of high temperature insulators and materials.

A substantial amount of work has been done in the development of these types of electrochemical cells and their electrodes. Examples of such high temperature cells and their various components are disclosed in U.S. Pat. Nos. 3,915,742 to Battles and Mrazek entitled "Interelectrode Separator for Electrochemical Cell", Oct. 28, 1975; 3,947,291 to Yao and Walsh entitled "Electrochemical Cell Assembled in Discharge State", Mar. 30, 1976; 3,992,222 to Walsh et al. entitled "Metallic Sulfide Additives for Positive Electrode Material within a Secondary Electrochemical Cell", Nov. 16, 1976, and 4,011,374 to Kaun entitled "Porous Carbonaceous Electrode Structure and Method for Secondary Electrochemical Cell", Mar. 8, 1977. Each of these patents is assigned to the assignee of the present application.

Previous electrochemical cells which operate at high temperatures, e.g. 300° – 600° C, have required the use of suitable high temperature materials. Refractory, electrically insulative materials such as boron nitride, and yttrium oxide have been fabricated into cloth, netting, felt, paper, other fabrics, etc., in attempts to provide suitable interelectrode separators. Although these efforts have been successful to some extent, they involve difficult and expensive fabrication, processes and sometimes provide separator components, that are not sufficiently tough and durable. Also, other oxides and nitrides of metals and metaloids such as magnesium oxide, calcium oxide, silicon nitride and aluminum nitride are unavailable or are difficult to provide in a fibrous form that can be fabricated readily into integral separator components.

Therefore, in view of these disadvantages of prior art separator materials, it is an object of the present invention to provide an improved interelectrode separator for an electrochemical cell.

It is a further object to provide an interelectrode separator that can be prepared during electrode preparation.

It is also an object to provide an electrochemical cell with an interelectrode separator that can employ readily available forms of refractory, electrically insulative material.

SUMMARY OF THE INVENTION

In accordance with the present invention a secondary electrochemical cell is provided with a positive electrode, a negative electrode, and an electrically insulative, porous separator between the electrodes. The porous separator is a layer of discrete particles of electrically insulative, refractory material.

In a more specific aspect of the invention one of the electrodes of the electrochemical cell includes solid, particulate active material intermixed with an electrolytic salt such as the alkali metal halides or alkaline earth metal halides, and is in a compacted relationship with a layer of electrically insulative, refractory particles.

The invention also includes an electrode structure with a first layer of particulate, active material and solid electrolytic salt and a second layer of refractory, electrically insulative, particles blended with particles of the electrolytic salt. The first and second layers are in compacted adherence to form an integral electrode structure with electrolytic salt as a binder. This electrode structure is adapted for assembly into an electrochemical cell opposite to an electrode of opposite polarity and for operation at a temperature sufficient to form molten electrolyte of the electrolytic salt particles.

In one method of preparing the electrode of the present invention particulate, electrically insulative, refractory material is blended with particulate electrolytic salt and disposed as a first layer within a die. A second particulate layer is added of electrode reactant, and other electrode materials including the electrolytic salt. The two layers are pressed within the die into an integral electrode structure for assembling within an electrochemical cell. The electrically insulative layer is positioned facing an electrode of opposite polarity. After the electrode is assembled within the electrochemical cell, it is heated to a sufficient temperature to melt the electrolytic salt and provide a porous, electrolyte-filled layer of discrete, electrically insulative, refractory particles between the electrodes of opposite polarity. In a more specific aspect of this method porous, electrically insulative layers of compacted, powder material are provided on the two opposite surfaces of the electrode reactant layer.

BRIEF DESCRIPTION OF THE DRAWINGS

The present invention is illustrated in the accompanying drawings wherein.

DETAILED DESCRIPTION OF THE PREFERRED EMBODIMENT

Figure 1:
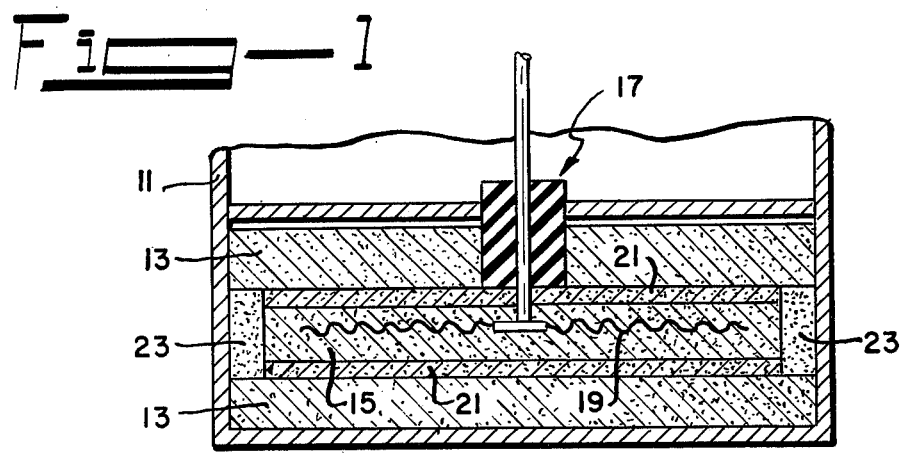
FIG. 1 is a cross sectional view of a secondary electrochemical cell.

In FIG. 1 an electrochemical cell is shown contained in an outer housing 11. The cell is illustrated with two negative electrodes 13 on either side of a positive electrode 15. An insulative feedthrough assembly 17 extends from the positive electrode, current collector 19 to outside the cell for electrical connection. The negative electrodes 13 are in electrical contact with the housing 11. The positive electrode 15 is separated from the two negative electrodes and the cell housing by upper and lower layers 21 of refractory, electrically insulative powders. During operation of the cell, these electrically insulative layers comprise discrete particles of the refractory material with sufficient porosity within the layers for permeation of molten electrolyte and ionic conduction between the electrodes.

The positive electrode, illustrated as the center electrode in FIG. 1, can be prepared in much the same manner as that described in allowed U.S. Pat. No. 4,006,034, Feb. 1, 1977, entitled "Improved Method of Preparing an Electrochemical Cell in Uncharged State" to Shimotake et al., filed Mar. 11, 1976. According to that method, particulate electrode material along with particulate electrically conductive material as current collector and powdered electrolyte can be blended together and pressed into an electrode compact. Current collector 19 and the attached conductor can be positioned between powdered layers of electrode material prior to pressing. The pressing can be carried out at ambient temperatures to merely compact the powders together or the temperature can be elevated during pressing to melt the electrolyte such that it diffuses throughout the electrode compact.

The negative electrodes 13 can be provided in a number of forms by a number of methods. They can be compacts of pressed wires, fibers, particles of the electrode active material either in the charged or discharged state. For instance, a compact of pressed aluminum wires can be electroprocessed to lithium-aluminum alloy as negative electrode material either within the cell or in a preparatory step. In the present development, fine mesh screens can be placed over such electrodes if their pore openings are sufficiently large to admit particles from the separator layer. In other instances, the negative electrodes might be prepared by compacting the active material with electrolyte in the same manner as the positive electrode. Various other techniques that are described and illustrated in the above cited patents also can be employed in providing the negative electrodes.

The electrolyte used can be of various ion containing materials, but for high temperature electrochemical cells electrolytic salt compositions that are molten at cell operating temperatures are employed. Temperatures in the range of 300° – 600° C. are contemplated. Electrolytic salt compositions of LiCl—KCl or LiCl—LiF—KBr along with various other suitable electrolytes such as those listed in U.S. Pat. No. 3,488,221 have been found to be suitable.

Separator layers 21 include powders of refractory, electrically insulative material such as boron nitride, magnesium oxide, calcium oxide, yttrium oxide, lithium aluminate, aluminum nitride, silicon nitride, or mixtures of these materials. Various other refractory, electrically insulative materials may also be suitable. These materials in powdered layers provide a porous, electrically insulative, interelectrode separator between electrodes of opposite polarity. Molten electrolyte within the void volume of the layers provide ionic conduction between the electrodes during charge and discharge of the cell. The annular volumes 23 between the edge surfaces of the central electrode 15 and the cell housing 11 are also filled with the powdered, electrically insulative material as the outer electrodes 13 are in electrical contact with the housing.

In one manner of assembling the cell, the electrode separator layers 21 can be applied in powdered form as the electrodes are placed into the cell housing. The lower, outer electrode 13 can be positioned within housing 11 followed by a layer of the refractory, electrically insulative powder. Then central electrode 15 is centered within the housing and the annular volumes 23 and the top surface of electrode 15 are filled and covered with the electrically insulative powder. The powder is advantageously blended with particles of the electrolytic salt to provide adequate electrolyte for the completed cell.

Figure 2:
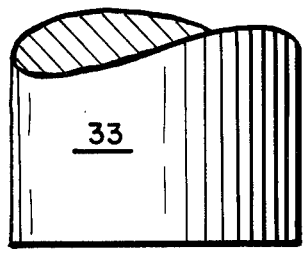
FIG. 2 is a cross sectional view of a die containing powdered layers in preparation of an electrode structure.

FIG. 2 illustrates a method of preparing the powdered, electrode separator layers as part of an integral electrode structure. A die 31 suitable for accepting upper and lower rams 33 and 34 is illustrated with three layers of powdered material. The upper and lower layers 35 and 37 include particles of the refractory, electrically insulative material blended with a ground powder of the selected electrolytic salt. The particulate mixture will typically include about 15–30 weight percent electrolytic salt and about 70–85 weight percent of the refractory, electrically insulative powder. It is advantageous to include a high electrolyte proportion such that on subsequent hot pressing all or nearly all of the porosity is filled with molten electrolyte. The permissible amount can be determined during the pressing step by observing electrolyte extrusion from the die.

The center layer 39 includes the electrode reactive material e.g. for positive electrodes, the sulfides of iron, cobalt, nickel, copper and other metals. Also, there can be included powdered, electrolytic salt and powdered, electrically conductive material e.g. carbon or metal particles as current collector. The active materials can be included in either the charge or the discharged state or intermediate states. For example, instead of including powdered $FeS_2$, or FeS, a mixture of $Li_2S$, and iron powder can be substituted. Also intermediate phases or compounds such as $Li_2FeS_2$ can be employed.

In assembling the three layers within the die an electrically conductive current collector network, illustrated at 41, and an electrical conductor 43 suitable for use as the electrode lead are positioned within the center layer 39 prior to pressing. Lower ram 34 is provided within an opening for accommodating conductor 43. In filling the die, 10 the lower separator layer and the lower half of the electrode material can be positioned in the die and cold pressed around a dummy or spacer rod prior to assembling the current collector and conductor.

The layers of powdered material are hot pressed at a sufficiently high temperature to melt the electrolytic salt, for instance, 350° – 450° C. at a pressure of 10 to 15 MPa (about 1500 – 2200 psig) for about 10 minutes to form an integral electrode structure incorporating interelectrode separators at its outer major surfaces.

An electrode structure of this type is illustrated as the center electrode 15 and electrically insulative layers 21 in FIG. 1. After assembling such a structure centrally within the cell housing above the lower electrode of opposite polarity, additional refractory, electrically insulative material mixed with an electrolyte can be vibrated into the annular volume 23 surrounding the edges of the central electrode 15. Since this powder is not hot pressed, voids can be minimized by using electrolyte powder of substantially smaller particle size, e.g. about one-tenth that of the refractory powder particles.

Figure 3:
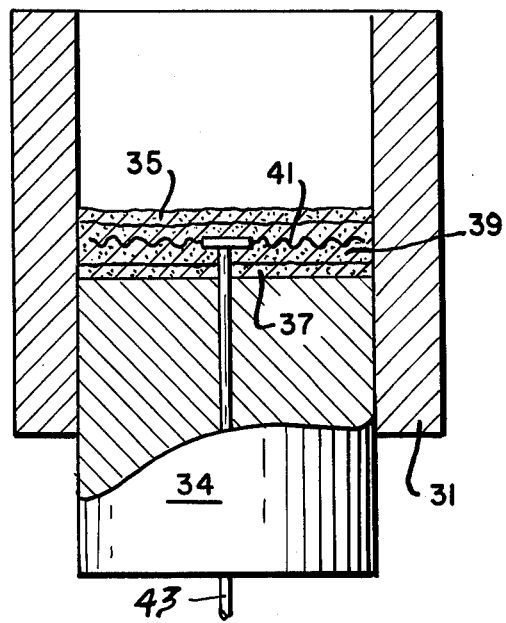
FIG. 3 is a cross sectional view of another die containing a compacted electrode and powdered layers for forming an integral electrode and separator structure.
Figure 3:
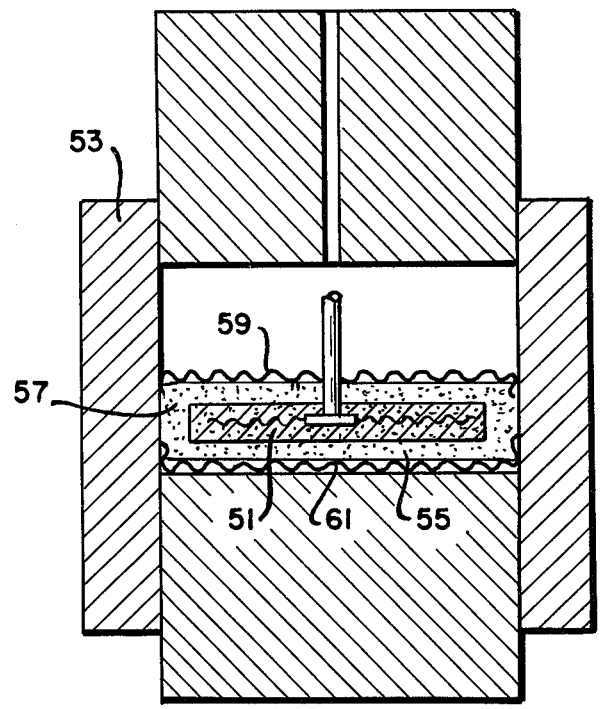

One other method of preparing an integral electrode structure is illustrated in FIG. 3. In this method an electrode 51 containing electrolyte, electrode active material and current collector is prepared as a pressed compact in a preliminary pressing step. The powdered separator material 55 is then pressed into the surfaces of the previously prepared electrode compact 51 in a second pressing step. In accomplishing this a lower layer of the refractory, electrically insulative powder mixed with electrolyte is distributed within die 53 before centrally positioning the electrode compact 51. Then the upper surface of compact 51 and the annular volume 57 around the edge surfaces of compact 51 are likewise covered and filled with the mixture of refractory material and electrolyte. In some instances fine mesh screens 59 and 61, e.g. 325 U.S. mesh series, are placed above and below the layers of refractory powder. The screens are especially advantageous where adjacent electrodes have openings of pores larger than the refractory particles or where the enclosed electrode 51 is expected to swell during cycling and displace the refractory separator layers. The screens 59 and 61 are illustrated as cup-shaped to enhance particle retention. The arrangement of the powdered mixture 55 surrounding the electrode compact 51 can be pressed at ambient or elevated temperatures into an integral electrode structure including screens 59 and 60 with the refractory particles embedded by pressure into both the upper, lower and edge surfaces of the electrode compact. An integral electrode structure is thus produced of the same outside diameter as the cell housing and is assembled without having to subsequently fill the annular volume between the electrode and the cell housing with the electrically insulative material. In addition, such an integral structure ensures that a complete layer of electrically insulative material is disposed between the edge surfaces of the central electrode and the cell housing.

The refractory particles employed in the electrode separators are of a generally equiaxed shape with equal dimensions in all direction. They need not be all of the same particle sizes. Through use of differing particle sizes advantages in compaction and reduced loss of particles can be obtained. It has been found that one advantageous particle size distribution will include particles of about 150-250 micrometers for about 70% of the refractory material weight and particles of 1-10 micrometers for the remaining 30% of the refractory material weight.

In each of the described embodiments of the powdered electrode separator a sufficient thickness is required to adequately insulate the electrodes from one another and the central or the ungrounded electrode from the cell housing. In order to do this without adding unduly to the cell weight, layers of about 2 to 4 mm thick have been incorporated into electrodes of about 10 cm diameter.

It will be understood that although the electrochemical cell of FIG. 1 and the described methods involve three electrodes and two layers of electrode separators, the invention is also applicable to other electrochemical cells having two or any other reasonable number of electrodes arranged in a stack or series. Either positive electrodes, as described and illustrated, or negative electrodes can be formed as integral structures with the separator layers. Various other cells and electrode designs, as illustrated in the above-cited patents, can also be arranged with the powdered separator design and the methods described herein.

The following examples are presented to further illustrate the present invention.

EXAMPLE I (CELL SC-13)

An electrochemical cell with a single negative electrode of Li — Al, LiCl — KCL electrolyte and a single positive electrode having FeS reactant was assembled in its discharged state. The positive and negative electrodes were separated by an approximately 4 mm thickness of yttria powder of about 150-200 micrometer particle size. Additional powder was vibrated into the annular volume between the positive electrode and the cell housing as well as distributed over the upper surface of the positive electrode. A 325 mesh U.S. Sieve Series screen was used over each electrode face for particle retention. The cell was continuously cycled at a current density of 75 mA/cm$^2$ for 2,000 hours (209 cycles) before the operation was voluntarily terminated. An examination after the test showed a uniform separator thickness was maintained around the positive electrode.

EXAMPLE II (CELL SC-14)

An electrochemical cell with a positive electrode similar to that illustrated in FIG. 1 was operated as an FeS/LiCl — KCl/LiAl cell. This cell differed from that described in Example I in that the powder separator layers were formed with the electrode in a single hot-pressing operation using LiCl — KCl as a binder. Also, the screens on the positive electrode surfaces were omitted but those covering the negative electrode were retained. The separator included about 70% by weight yttria particles of 150-250 micrometers and about 30% by weight fine yttria particles of 1-10 micrometers. The powder was blended with about 15% by weight LiCl — KCl salt. After compaction each separator layer was about 2 millimeters thick. Additional amounts of the 70/30 yttria powder mixture was compacted between the positive electrode edges and the cell housing during assembly. The cell was operated for over 1000 hours and 78 cycles at close to 100% coulombic efficiency and 50% utilization of electrode materials before operation was voluntarily terminated.

It can be seen from the above that the present invention provides a new separator concept for high-temperature, high-power secondary electrochemical cells. The development provides a means for employing refractory material such as calcium oxide, magnesium oxide, silicon nitride and aluminum nitride which are ordinarily only available in powdered form. It also permits formation of electrode separators along with the ordinary electrode preparation processes. The formation of integral electrode-separator structures facilitates cell assembly and ensures adequate thickness of the separator layers.

The embodiments of the invention in which an exclusive propery or privilege is claimed are defined as follows:

1. In a high-temperature secondary electrochemical cell having a positive electrode including a sulfide of a metal selected from the group consisting of iron sulfides, nickel sulfide, cobalt sulfide, and copper sulfide, a negative electrode including an alloy of lithium and an electrically insulated, porous separator between said electrodes, the improvement wherein said porous separator comprises a layer of discrete particles of electrically insulative and refractory material in mixture with particles of electrolytic salt composition that is molten at cell operating temperatures between 300° and 600° C, said electrically insulative and refractory materials being selected from the group consisting of boron nitride, magnesium oxide, calcium oxide, yttria, lithium aluminate, silicon nitride, aluminum nitride, and mixtures thereof.

2. The electrochemical cell of claim 1 wherein at least one of said electrodes comprises solid, particulate, active material and is in compacted relationship with said separator of discrete, electrically insulative particles.

3. The electrochemical cell of claim 1 wherein said porous separator comprises generally equiaxed shaped particles of about 150 to 250 micrometers in diameter.

4. The electrochemical cell of claim 1 wherein said discrete particles of electrically insulative material are of generally equiaxed shape and include about 70% by weight, coarse particles of 150 to 250 micrometers and about 30% by weight of fine particles of 1 to 10 micrometers.

5. An electrode structure adapted for use in a high-temperature secondary electrochemical cell opposite to a second electrode of opposite polarity; said electrode structure comprises a first layer of particulate active material including sulfide of a metal selected from the group consisting of iron sulfides, cobalt sulfide, nickel sulfide, and copper sulfide, and a solid electrolytic salt selected from the group consisting of alkali metal halides, the alkaline earth metal halides and mixtures thereof; and a second layer of refractory, electrically insulative, particles selected from the group consisting of boron nitride, magnesium oxide, calcium oxide, yttria, lithium aluminate, silicon nitride, aluminum nitride and mixtures thereof mixed with particles of said electrolytic salt, said first and second layers being compacted together to form an integral electrode structure with the electrolytic salt as a binder wherein the electrolytic salt is made molten at the operating temperature of the electrochemical cell to form a porous electrode reactant layer and an electrically insulative layer.

6. The electrode structure of claim 5 wherein said particulate mixture within said second layer comprises about 15-30% by weight of said electrolytic salt and about 70-85% by weight of said refractory, electrically insulative material.

7. The electrode structure of claim 5 wherein said second layer comprises particles of generally equiaxed shape and about 150 to 250 microns particle size.

8. The electrode structure of claim 5 disposed as a positive electrode within an electrochemical cell containment with major surfaces facing lithium-aluminum negative electrodes and edge surfaces facing the cell containment, and wherein refractory electrically insulative powder mixed with electrolyte powder is provided between the edge surfaces of the electrode structure and the cell containment.

9. The electrode structure of claim 8 wherein the electrolyte powder particles at the electrode structure edge surfaces are about one-tenth the size of the refractory, electrically insulative particles with which they are in mixture.

* * * * *